(No Model.)
A. J. SMITH.
RAISIN SEEDER.
No. 572,075. Patented Nov. 24, 1896.
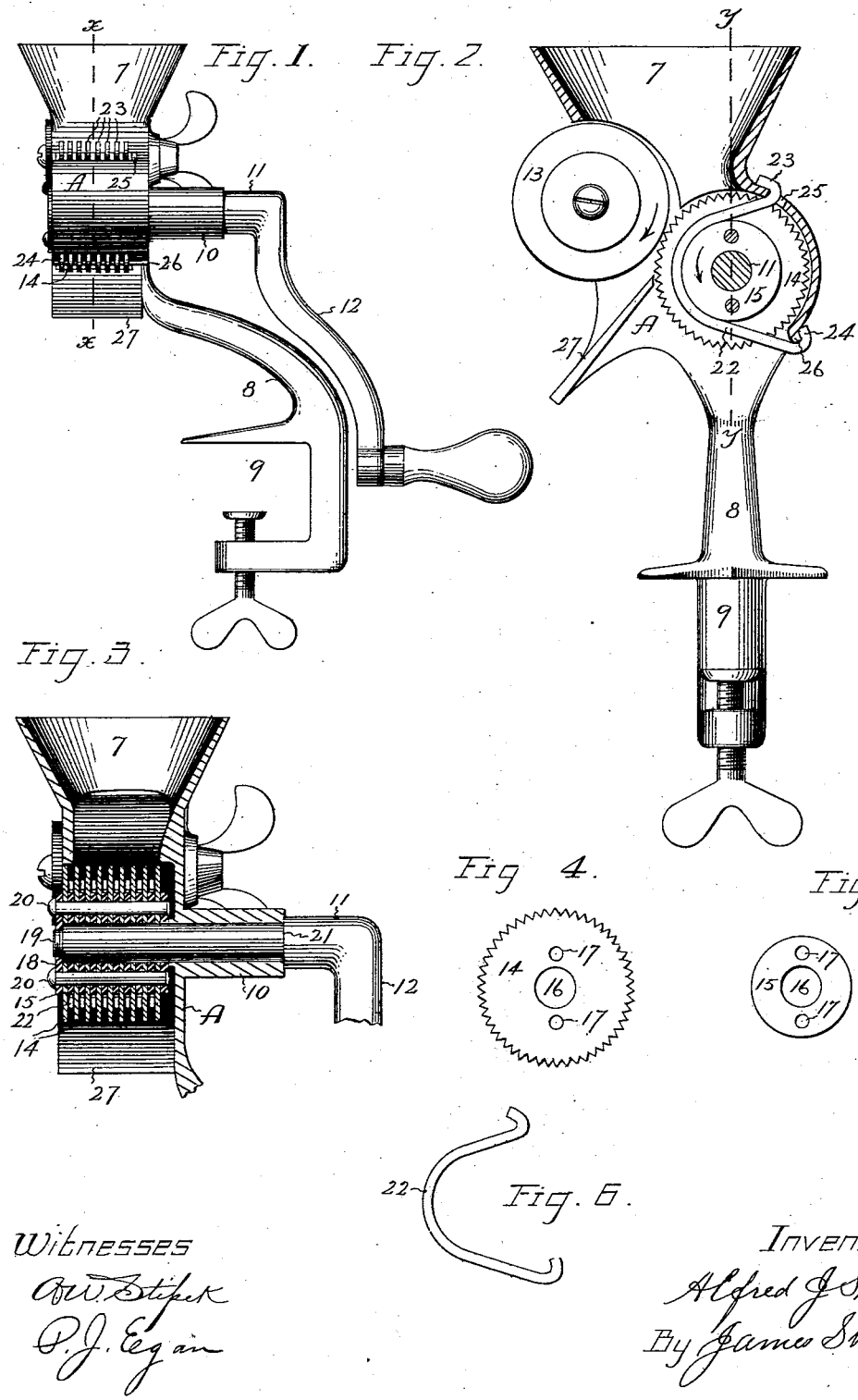
Witnesses
O. W. Stifel
P. J. Egan
Inventor
Alfred J. Smith
By James Shepard.
Att'y.

UNITED STATES PATENT OFFICE.

ALFRED J. SMITH, OF NEW BRITAIN, CONNECTICUT.

RAISIN-SEEDER.

SPECIFICATION forming part of Letters Patent No. 572,075, dated November 24, 1896.

Application filed May 7, 1896. Serial No. 590,574. (No model.)

*To all whom it may concern:*

Be it known that I, ALFRED J. SMITH, a citizen of the United States, residing at New Britain, in the county of Hartford and State of Connecticut, have invented certain new and useful Improvements in Raisin-Seeders, of which the following is a specification.

My invention relates to improvements in raisin-seeders; and the objects of my improvement are simplicity and economy in construction and efficiency and convenience in use.

In the accompanying drawings, Figure 1 is a front elevation of my raisin-seeder. Fig. 2 is an enlarged vertical section of the same on the line $x\, x$ of Fig. 1. Fig. 3 is a vertical section of the upper portion of the same on the line $y\, y$ of Fig. 2, the crank-shaft being shown in elevation. Fig. 4 is a detached side elevation of one of the toothed disks. Fig. 5 is a like view of one of the plane disks, and Fig. 6 a like view of one of the clearers.

My raisin-seeder is of the well-known class that comprises an elastic pressure-roller, a toothed and grooved roller in contact therewith, and clearers within the grooves of the toothed roller. The frame or case A is provided with a hopper 7 and standard 8, the said standard preferably terminating in a suitable clamp 9 for securing the machine upon a shelf or table, all substantially as in other machines of this class. Said case or frame is also provided with a tubular hub 10 of a length to furnish a suitable bearing for the crank-shaft 11, said shaft having any desired form of crank 12. The elastic roller 13 is or may be of any ordinary construction and supported in any proper manner on the frame to rotate with the toothed and grooved main roller that is mounted on the crank-shaft 11. I form said main roller of alternate toothed and plane disks 14 and 15, each having a central hole 16 and two rivet-holes 17, as shown in the detached view, Figs. 4 and 5. With the exception of the outer plane disk 18 the holes in all the disks are of a size to fit the body of the crank-shaft. The outer disk 18 has a smaller central hole, which is threaded internally to screw onto the reduced and threaded end 19 of the crank-shaft. The disks thus formed are placed together in alternation, as shown in Fig. 3, and rivets 20 passed through them and riveted to hold the several disks rigidly together in one roller. The main roller thus formed and the crank-shaft is of such length that when the shoulder 21 of the crank-shaft bears against the outer end of the tubular hub 10 and the said roller is screwed on with its outer disk 18 against the shoulder at the reduced threaded end 19 of the crank-shaft the inner disk of said roller will bear against the frame or inner end of the tubular hub 10 and confine said shaft and roller longitudinally in place.

I make the clearers 22 of the skeleton form shown in Figs. 2 and 6, and I prefer to form them of rectangular or flattened wire bent to the form shown, having hooks 23 and 24 at their respective ends. The case of the machine is left open on its left-hand side, so as not to cover the left-hand end of the rollers. On the back of the case, above the crank-shaft, I form a slot 25, the left-hand end of which is open, and below the crank-shaft the back wall of the case terminates in a flange 26. The middle portion of each clearer is curved to conform to the outer edges of the plane disks, as shown in Fig. 2. Said clearers are placed within the grooves of the main roller, and as said roller is slipped endwise into place on the crank-shaft the hooks 23 of the clearers are passed into the slot 25, where they extend over the rear wall of the case, and the hooks 24 at the lower end of the clearers are pressed into position with their ends over the back of the flange 26, as shown in Fig. 2. When the main roller is fully screwed on, these clearers cannot become detached nor work out of place. The case or frame is also provided with the usual seed scraper or clearer 27. The rollers are turned in the direction indicated by the darts in Fig. 2, and the lower arm of the clearers acts to free the main roller from the raisin-pulp.

By my improvement I can form the clearers of light wire, and consequently at a small cost, and at the same time there is no liability of their breaking or bending in use. I can also, if desired, readily separate them from the main roller and from each other when said roller is intact. By making the main roller of the disks secured together by two or more rivets I make a firm and solid roller at a small cost and one which is adapted to be screwed on and off the crank-shaft.

I claim as my invention—

A machine for seeding raisins having in combination a grooved and toothed main roller, the case or frame, and the skeleton clearers extending partly around said roller and provided with hooks at their ends for engaging said case and by means of which hooks they are attachably and detachably secured to said case, substantially as described and for the purpose specified.

ALFRED J. SMITH.

Witnesses:
　JOHN J. NEENAN,
　O. V. JUDD.